United States Patent
Morgan et al.

(10) Patent No.: US 10,884,720 B2
(45) Date of Patent: Jan. 5, 2021

(54) MEMORY ORDERING ANNOTATIONS FOR BINARY EMULATION

(71) Applicant: Microsoft Technology Licensing, LLC, Redmond, WA (US)

(72) Inventors: Henry Morgan, Redmond, WA (US); Ten Tzen, Sammamish, WA (US); Christopher Martin McKinsey, Sammamish, WA (US); YongKang Zhu, Redmond, WA (US); Terry Mahaffey, Apex, NC (US); Pedro Miguel Sequeira de Justo Teixeira, Kirkland, WA (US); Arun Upadhyaya Kishan, Kirkland, WA (US); Youssef M. Barakat, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 163 days.

(21) Appl. No.: 16/152,177

(22) Filed: Oct. 4, 2018

(65) Prior Publication Data
US 2020/0110587 A1 Apr. 9, 2020

(51) Int. Cl.
G06F 9/44 (2018.01)
G06F 8/41 (2018.01)
G06F 9/30 (2018.01)

(52) U.S. Cl.
CPC ............ *G06F 8/41* (2013.01); *G06F 9/30043* (2013.01)

(58) Field of Classification Search
None
See application file for complete search history.

(56) References Cited

U.S. PATENT DOCUMENTS 7,096,322 B1 8/2006 Sollom et al.
8,392,900 B1* 3/2013 Collard .................. G06F 8/458
717/159

(Continued)

OTHER PUBLICATIONS

"International Search Report and Written Opinion Issued in PCT Application No. PCT/US19/064091", dated Feb. 20, 2020, 15 Pages.

(Continued)

*Primary Examiner* — Insun Kang
(74) *Attorney, Agent, or Firm* — Workman Nydegger

(57) ABSTRACT

During source code compilation to a first processor instruction set architecture (ISA), a compiler encounters a memory ordering constraint specified in the source code. The compiler generates binary emulation metadata that is usable during emulation of emitted machine code instructions of the first ISA, in order to enforce the memory ordering constraint within corresponding machine code instructions of a second ISA. An emulator utilizes this binary emulation metadata during emulation of a resulting executable image at a processor implementing the second ISA. When the emulator encounters a machine code instruction in the image that performs a memory operation, it identifies an instruction memory address corresponding to the instruction. The emulator determines whether the binary emulation metadata identifies the instruction memory address as being associated with a memory ordering constraint. If so, the emulator emits machine code instruction(s) in the second ISA that perform the memory operation using a memory barrier.

20 Claims, 5 Drawing Sheets

(56) References Cited

U.S. PATENT DOCUMENTS

| | | | |
|---|---|---|---|
| 10,268,462 B2 | 4/2019 | Kunugi | |
| 10,360,654 B1* | 7/2019 | Maiyuran | G06F 9/30043 |
| 10,515,049 B1* | 12/2019 | Fleming | G06F 12/08 |
| 10,684,835 B1 | 6/2020 | Mola | |
| 2006/0277231 A1 | 12/2006 | Kral et al. | |
| 2008/0091923 A1 | 4/2008 | Fulton et al. | |
| 2008/0177985 A1 | 7/2008 | Sandham et al. | |
| 2009/0006074 A1 | 1/2009 | Green | |
| 2009/0144733 A1 | 6/2009 | Oiwa et al. | |
| 2012/0131575 A1 | 5/2012 | Yehuda et al. | |
| 2012/0144167 A1 | 6/2012 | Yates et al. | |
| 2012/0174083 A1* | 7/2012 | Shpeisman | G06F 8/443 717/153 |
| 2012/0198428 A1 | 8/2012 | Schmidt | |
| 2013/0283014 A1* | 10/2013 | Wang | G06F 9/30098 712/217 |
| 2014/0068240 A1* | 3/2014 | Nightingale | G06F 9/44557 713/2 |
| 2014/0122845 A1* | 5/2014 | Chung | G06F 9/3861 712/228 |
| 2014/0354644 A1* | 12/2014 | Nystad | G06F 9/30 345/426 |
| 2014/0372995 A1* | 12/2014 | Mori | G06F 8/452 717/146 |
| 2015/0026442 A1* | 1/2015 | Giroux | G06F 9/3836 712/233 |
| 2015/0095625 A1* | 4/2015 | Hassanein | G06F 9/45516 712/226 |
| 2015/0286472 A1* | 10/2015 | Lim | G06F 9/45525 717/151 |
| 2015/0379169 A1 | 12/2015 | Wu et al. | |
| 2016/0179586 A1* | 6/2016 | Wang | G06F 9/3834 711/125 |
| 2016/0246641 A1* | 8/2016 | Kogan | G06F 3/0629 |
| 2017/0068521 A1 | 3/2017 | Bertran monfort et al. | |
| 2017/0083319 A1* | 3/2017 | Burger | G06F 9/3836 |
| 2017/0083326 A1* | 3/2017 | Burger | G06F 9/3851 |
| 2017/0083343 A1* | 3/2017 | Burger | G06F 9/3867 |
| 2017/0097835 A1* | 4/2017 | Tzen | G06F 9/4484 |
| 2017/0220328 A1 | 8/2017 | Cui et al. | |
| 2018/0032344 A1* | 2/2018 | Smith | G06F 9/3834 |
| 2018/0052667 A1 | 2/2018 | Kunugi | |
| 2018/0060213 A1 | 3/2018 | Mola | |
| 2018/0088988 A1* | 3/2018 | Rabet | G06F 9/485 |
| 2018/0107465 A1* | 4/2018 | Silbermintz | G06F 8/443 |
| 2018/0143835 A1* | 5/2018 | Whittaker | G06F 9/30185 |
| 2018/0165079 A1 | 6/2018 | Isshiki | |
| 2018/0188983 A1* | 7/2018 | Fleming, Jr. | G06F 3/067 |
| 2018/0246719 A1* | 8/2018 | Mihocka | G06F 9/4552 |
| 2019/0079865 A9* | 3/2019 | Latorre | G06F 9/3859 |
| 2019/0114173 A1* | 4/2019 | Dang | G06F 9/30174 |
| 2019/0303153 A1* | 10/2019 | Halpern | G06F 9/30072 |
| 2019/0362460 A1* | 11/2019 | Maiyuran | G06F 8/41 |
| 2020/0019388 A1 | 1/2020 | Jaeger et al. | |
| 2020/0026581 A1* | 1/2020 | Ogata | G06F 9/522 |
| 2020/0034276 A1 | 1/2020 | O'dowd et al. | |
| 2020/0082273 A1* | 3/2020 | Rossi | G06F 9/4881 |

OTHER PUBLICATIONS

"Notice of Allowance Issued in U.S. Appl. No. 16/216,601", dated Feb. 12, 2010, 12 Pages.

* cited by examiner

MEMORY ORDERING ANNOTATIONS FOR BINARY EMULATION

BACKGROUND

Modern microprocessors (processors) employ many techniques to achieve high performance. For instance, a processor may include multiple physical cores, each capable of executing independent threads simultaneously with the other cores, such that the processor can simultaneously execute a plurality of threads. Additionally, or alternatively, a single physical processor core may be capable of simultaneously executing two or more threads—this capability is known as simultaneous multi-threading, or SMT (also referred to as hyper-threading). When SMT is used, each physical core is viewed as including two or more "logical" cores that each executes a different thread using shared execution units (e.g., multiple arithmetic logic units). In some implementations in which a processor possesses multiple physical cores, each of these physical cores is also an SMT-capable core; as such, the processor might present a number of logical cores that is double the number of physical cores present.

Another technique used to increase processor performance is for a core to execute individual machine code instructions in an order other than the order in which they were written by a software developer or, more typically, other than the order in which they were generated by a compiler from source code. Such "out of order" execution enables the core to more fully utilize its internal processor resources (e.g., execution units), which are often highly parallelized. For example, if two (or more) machine code instructions in a given code stream are not dependent on each other, a single processor core may be able to execute these instructions in parallel, rather than idly waiting for one instruction to complete prior to serially executing the next.

Out-of-order execution can be applied to many types of machine code instructions, including instructions that perform memory operations (i.e., operations that read from or write to a memory hierarchy, typically including one or more caches and system memory). Due to out-of-order execution and/or memory hierarchy design, memory accessing operations executing at one processor core may be perceived by another processor core (or another processor) as occurring in a different order than that prescribed in the original stream of machine code instructions.

In many cases, multiple threads simultaneously executing at one or more processor cores are related, such as being part of the same application process. When simultaneously executing threads are related, the machine code instructions executing for one thread may perform memory operations that affect one or more of the other threads, by accessing (i.e., reading from and/or writing to) a memory location in the memory hierarchy that is being used by one or more of the other threads. For example, a thread may access a shared variable (e.g., a global variable), a data structure that is shared by the threads, etc. If memory operations from different threads are executed out-of-order at their respective cores (physical or logical), and/or executed out-of-order by the memory hierarchy, this out-of-order execution could lead to memory corruption and/or runtime errors if it is not done correctly.

To enable memory operations to be re-ordered while preserving correctness, modern processors employ hardware memory models that define how memory effects are globally visible in a multi-processor (including multi-core) system. In particular, hardware memory models define how threads can interact through shared memory, including how they can use shared data such as synchronization variables. In general, a processor's hardware memory model defines what types of out-of-order execution of memory operations are possible when executing multiple threads.

Processors implement different processor instruction set architectures (ISAs), referred to herein as processor ISAs or processor architectures. Some processor architectures have hardware memory models that tend to apply many restrictions to out-of-order execution of memory operations, and are thus referred to as having a generally "strong" memory model or as being a strongly-ordered ISA. Other processor architectures have hardware memory models that tend to apply fewer restrictions to out-of-order execution of memory operations, and are thus referred to as having a generally "weak" memory model or as being a weakly-ordered ISA. Memory models can therefore fall on a spectrum from the strongest (e.g., a "sequentially consistent" memory model with no memory reordering) to the weakest (e.g., in which any load or store operation can effectively be reordered with any other load or store operation, as long as it would not modify the behavior of a single, isolated thread).

To illustrate, the x86 family of processor ISAs (e.g., x86, x86-64, referred to herein collectively as x86) have a relatively strong memory model, in which machine code instructions usually come implicitly with acquire and release semantics. As a result, for most x86 instructions, when one core performs a sequence of writes, every other core generally sees those values change in the same order that they were written. In general, a machine code instruction has "acquire semantics" if other cores will always see its memory effect before any subsequent instruction's memory effect, and an instruction has "release semantics" if other cores will see every preceding instruction's memory effect before the memory effect of the instruction itself. By contrast, the ARM-compatible family of processor ISAs (e.g., AArch32, AArch64, referred to collectively as ARM) have a relatively weak or "relaxed" memory model compared to x86 processor ISAs and permit many types of memory operation reordering so long as address dependencies are preserved.

Source code compilers (compilers) account for the hardware memory model of a target processor architecture when compiling source code into machine code instructions. As part of performing code optimization, compilers are normally are free to reorder memory accesses that are not interdependent in the target memory model. To ensure correct behavior in multi-threaded programs, many programming languages and/or compilers enable software developers to specify memory ordering constraints that prevent this reordering from occurring through annotations to specific locations in source code. Such annotations prevent many compiler optimizations, such as eliding a corresponding memory access, reordering the memory access relative to any other memory access, assuming invariance and hoisting the memory access out of a loop, etc. In the specific example of the C/C++ languages/compilers, such annotations could include adding the keyword 'volatile' to a type, variable definition, and/or memory access. Some compilers also provide custom intrinsic functions, such as '_ReadWriteBarrier' in MICROSOFT'S VISUAL C++ compiler, which prevent the compiler from reordering memory accesses around the function call, irrespective of volatility.

When emitting machine code instructions for a strongly-ordered ISA, such as x86, a compiler might rely heavily on the stricter ordering constraints of that ISA's memory model to guarantee that these developer-specified memory ordering constraints are honored. For example, when compiling with a strongly-ordered ISA as the target, it is often sufficient to place the generated memory-accessing machine code instructions in the same order as in the original source code, and rely on the implicit acquire and release semantics of the generated machine code instructions to guarantee the developer-specified memory ordering constraints.

Frequently, it is desirable to emulate execution of a binary that was compiled for processors having a first ISA on a target processor having a second ISA. This emulation may involve converting (e.g., interpreting and/or translating) first machine code instructions of the first ISA into to equivalent second machine code instructions of the second ISA, and executing those second machine code instructions at the target processor.

BRIEF SUMMARY

Binary emulation can present significant challenges, particularly when emulating execution of a binary that was compiled for a strongly-ordered ISA (e.g., such as an x86 ISA) on a target processor having a weakly-ordered ISA (e.g., such as an ARM ISA). When compiling source code to machine code instructions of a strongly-ordered ISA, compilers often rely heavily on the stricter ordering constraints of this strongly-ordered ISA. As such, these compilers often do not emit explicit machine code instructions corresponding to source code annotations that specify memory ordering constraints; instead, they often rely on the inherent acquire/release semantics of emitted machine code instructions that perform memory operations. This means that the explicit memory ordering requirements conveyed by these annotations are lost in the resulting strongly-ordered binary.

Later, when emulating execution of this strongly-ordered binary on a target processor, it is difficult for a binary emulator (emulator) to determine, from the machine code instructions of the strongly-ordered binary, themselves, what memory ordering constraints actually existed in the original source code. As a result, when emulating execution of this strongly-ordered binary on a target processor having a weakly-ordered ISA, emulators often pessimistically emit memory barriers (e.g. "fence" instructions) for all machine code instructions in the weakly-ordered ISA that perform memory operations. These memory barriers force those memory operations to execute on the target processor with ordering restrictions that are similar to those that would have existed when executing the strongly-ordered binary directly (i.e., without emulation) on a processor implementing the strongly-ordered ISA.

The inventors have recognized that, since emulators operate based on individual instructions within an input binary, rather than explicit source code annotations that specify memory ordering constraints, many of the memory barriers they emit to emulate execution of the input binary on a target processor are not actually necessary for correct emulation of the source binary on the target processor—harming execution performance on the target processor and needlessly increasing the number of instructions emitted to carry out the emulation. This is particularly true when the target processor architecture has a weaker memory model than the processor architecture to which the input binary was compiled.

At least some embodiments described herein modify a compiler so that it retains developer-specified memory ordering constraints, by causing the compiler to generate metadata during compilation of source code to first machine code instructions of a first processor ISA. This metadata captures memory ordering constraints that were specified by annotations within source code, but which are often not expressly emitted into the first machine code instructions, themselves. This generated metadata can then be used during emulation of the resulting binary on a target processor having a second processor ISA, in order to ensure that instructions executed on the target processor honor the developer-specified memory ordering constraints originally specified in the source code.

These embodiments can improve the performance of the binary emulation process, can improve execution performance of the emulated binary at the target processor, and can reduce translated binary size. These benefits become especially apparent when the second processor ISA (e.g., ARM) has a weaker memory model than the first processor ISA (e.g., x86). In particular, the embodiments herein enable an emulator to granularly emit memory barriers for execution on a target processor based on the memory ordering constraints originally specified in the source code used to generate an input binary that is being emulated, rather than to pessimistically emit memory barriers for all memory operations.

At least some embodiments described herein are directed to methods, systems, and computer program products that generate binary emulation metadata during source code compilation. For example, during compilation of source code into a plurality of first machine code instructions of a first processor ISA, a compiler can encounter a memory ordering constraint specified by the source code. Based on encountering the memory ordering constraint, the compiler can generate binary emulation metadata that is usable during emulation of at least one of the plurality of first machine code instructions on a second processor ISA, to enforce the memory ordering constraint within corresponding second machine code instructions of the second processor ISA. The compiler can then store the generated binary emulation metadata in association with the plurality of first machine code instructions.

Additionally, at least some embodiments described herein are directed to methods, systems, and computer program products that utilize binary emulation metadata associated with an executable image during binary emulation of the executable image from a first processor ISA to a second processor ISA. For example, during emulation by the one or more processors of a plurality of first machine code instructions of the first processor ISA contained in the executable image, an emulator can encounter a particular first machine code instruction of the plurality of first machine code instructions that performs a memory operation. The emulator can identify an instruction memory address corresponding to the particular first machine code instruction, and can determine whether the binary emulation metadata associated with the executable image identifies the instruction memory address as being associated with a memory ordering constraint. If so, the emulator can emit one or more second machine code instructions in the second processor ISA that perform the memory operation using a memory barrier.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
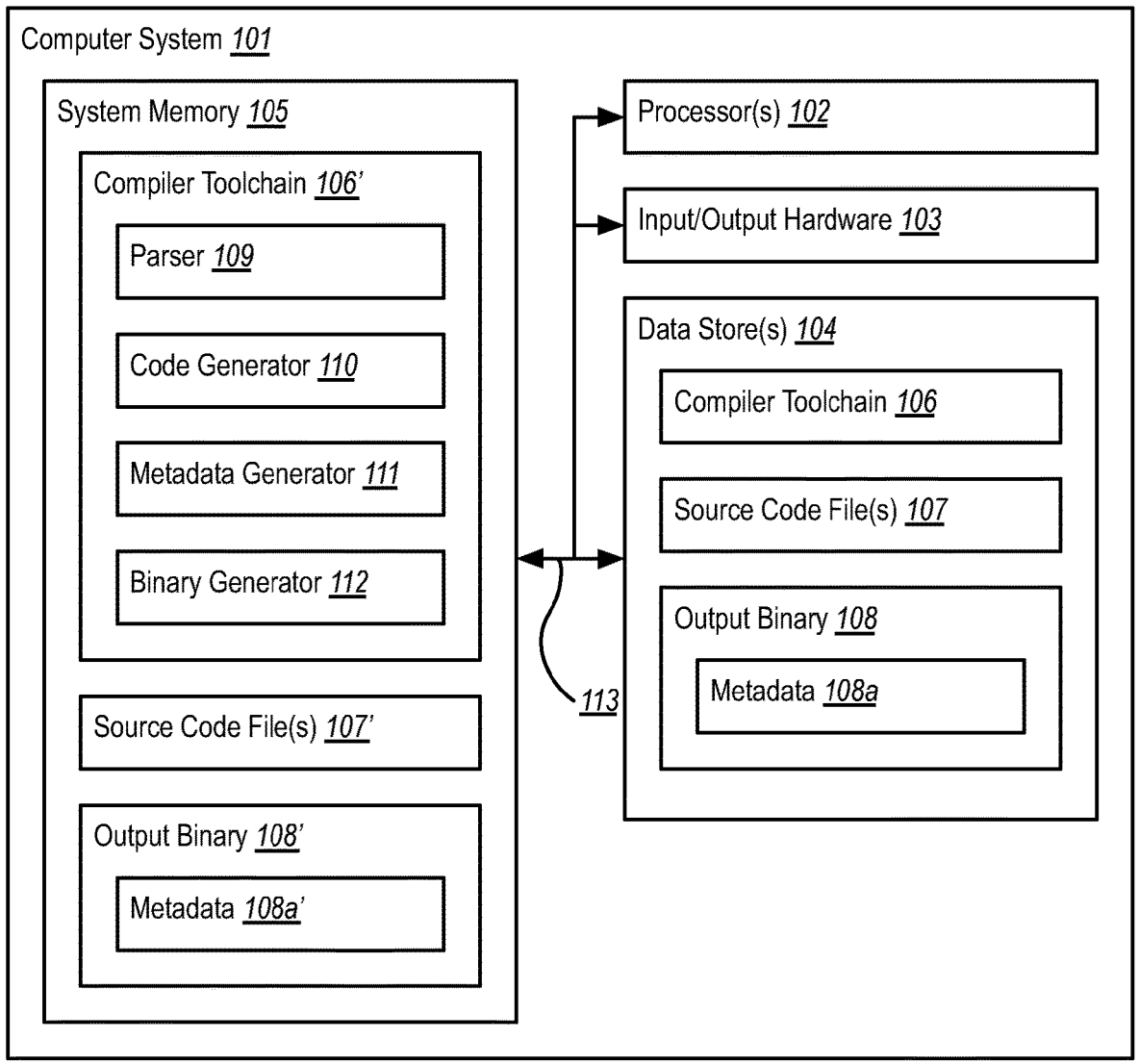
FIG. 1 illustrates an example computer architecture that facilitates generating and preserving binary emulation metadata during source code compilation.

Binary emulation can present significant challenges, particularly when emulating execution of a binary that was compiled for a strongly-ordered ISA (e.g., such as an x86 ISA) on a target processor having a weakly-ordered ISA (e.g., such as an ARM ISA). When compiling source code to machine code instructions of a strongly-ordered ISA, compilers often rely heavily on the stricter ordering constraints of this strongly-ordered ISA. As such, these compilers often do not emit explicit machine code instructions corresponding to source code annotations that specify memory ordering constraints; instead, they often rely on the inherent acquire/release semantics of emitted machine code instructions that perform memory operations. This means that the explicit memory ordering requirements conveyed by these annotations are lost in the resulting strongly-ordered binary.

Later, when emulating execution of this strongly-ordered binary on a target processor, it is difficult for a binary emulator (emulator) to determine, from the machine code instructions of the strongly-ordered binary, themselves, what memory ordering constraints actually existed in the original source code. As a result, when emulating execution of this strongly-ordered binary on a target processor having a weakly-ordered ISA, emulators often pessimistically emit memory barriers (e.g. "fence" instructions) for all machine code instructions in the weakly-ordered ISA that perform memory operations. These memory barriers force those memory operations to execute on the target processor with ordering restrictions that are similar to those that would have existed when executing the strongly-ordered binary directly (i.e., without emulation) on a processor implementing the strongly-ordered ISA.

The inventors have recognized that, since emulators operate based on individual instructions within an input binary, rather than explicit source code annotations that specify memory ordering constraints, many of the memory barriers they emit to emulate execution of the input binary on a target processor are not actually necessary for correct emulation of the source binary on the target processor—harming execution performance on the target processor and needlessly increasing the number of instructions emitted to carry out the emulation. This is particularly true when the target processor architecture has a weaker memory model than the processor architecture to which the input binary was compiled.

At least some embodiments described herein modify a compiler so that it retains developer-specified memory ordering constraints, by causing the compiler to generate metadata during compilation of source code to first machine code instructions of a first processor ISA. This metadata captures memory ordering constraints that were specified by annotations within source code, but which are often not expressly emitted into the first machine code instructions, themselves. This generated metadata can then be used during emulation of the resulting binary on a target processor having a second processor ISA, in order to ensure that instructions executed on the target processor honor the developer-specified memory ordering constraints originally specified in the source code.

These embodiments can improve the performance of the binary emulation process, can improve execution performance of the emulated binary at the target processor, and can reduce translated binary size. These benefits become especially apparent when the second processor ISA (e.g., ARM) has a weaker memory model than the first processor ISA (e.g., x86). In particular, the embodiments herein enable an emulator to granularly emit memory barriers for execution on a target processor based on the memory ordering constraints originally specified in the source code used to generate an input binary that is being emulated, rather than to pessimistically emit memory barriers for all memory operations.

In some embodiments, this emitted binary emulation metadata could be stored in one or more files that are distinct from the compiled binary. Additionally, or alternatively, this binary emulation metadata could be embedded into an executable image, itself, such as in one or more tables in the image's data segment that are identified in the image's header (e.g., a Portable Executable (PE) or an Executable and Linkable Format (ELF) header). Additionally, or alternatively, this binary emulation metadata could even be part of the code stream of the first machine code instructions, themselves. For example, the metadata could be embedded as one or more no-operation (no-op) instructions and/or one or more pseudo-instructions. These instruction(s) may not actually be executed by the first processor ISA, or may be executed by the first processor ISA without affecting program state, while signaling one or more appropriate memory constraints to an emulator.

As used herein, the term "emulation" can encompass both translation and interpretation. For example, binary translation is a form of binary recompilation where sequences of instructions in a source binary that was compiled for a source processor ISA are translated to a target processor ISA, resulting in a translated binary that can be directly executed on a processor implementing the target ISA. Binary interpretation, on the other hand, occurs "just-in-time" while executing a source binary at processor implementing the target ISA. Thus, instructions in the source binary are dynamically translated to corresponding instructions in a target ISA as they are encountered during live emulation of the source binary.

FIG. 1 illustrates an example computer architecture 100 that facilitates generating and preserving binary emulation metadata during source code compilation. Referring to FIG. 1, computer architecture 100 includes a computer system 101, which is configured to compile source code into machine code instructions for execution at a first processor architecture. As shown, computer system 101 includes one or more processor(s) 102 (also referred to more concisely herein as processor 102), input/output hardware 103 (e.g., display, user input, networking, etc.), one or more data store(s) 104 (also referred to more concisely herein as data store 104), and system memory 105. As indicated by arrows 113, each of these components can be communicatively interconnected such as by a bus.

In computer architecture 100, the processor 102 may implement any processor architecture, such as x86, ARM, etc. Notably, the processor 102 does not necessarily need to match the destination processor ISA of the machine code instructions that computer architecture 100 generates from source code. However, in embodiments, the processor 102 implements a relatively strongly-ordered ISA, such as x86.

As shown, the data store 104 can store a variety of programs and data, such as the illustrated compiler toolchain 106, one or more source code file(s) 107 (also referred to more concisely herein a source code 107), and output binary 108. In general, and as will be described, the compiler toolchain 106 converts the source code 107 into an output binary 108 targeted to a particular processor ISA. As will be discussed, the output binary 108 includes and/or is associated with binary emulation metadata 108a that is usable during emulation of the output binary 108 on a processor ISA other than the targeted processor ISA.

In general, the source code 107 comprises human-readable program code, typically authored by a software developer. The source code 107 could include program code written in the syntax of one or more of any available programming language that enables express developer specification of memory ordering constraints—such as through annotation keywords (e.g., 'volatile' in C/C++) and/or intrinsic functions. The source code 107 could exist within a single file or could be distributed over a plurality of files.

The compiler toolchain 106 comprises one or more programs that are executable by the processor 102 in order to convert the source code 107 into machine code instructions of a target processor ISA (whether that be the same processor ISA of processors 102, or some other processor ISA), and to package those machine code instructions into an executable image that is executable on any processor implementing the target processor ISA. In FIG. 1, the compiler toolchain 106 includes the word "toolchain" to emphasize that it is not necessarily a single program. For example, the compiler toolchain 106 could include a variety of tools, such as a preprocessor, a compiler, an assembler, a linker, etc. Notably, the embodiments herein are not limited to any particular compiler toolchain, or any arrangement of tools within a compiler toolchain.

The output binary 108 is a result of compilation of the source code 107 by the compiler toolchain 106 (i.e., an executable binary image that can be executed at a processor implementing a target processor ISA). As was mentioned, the output binary 108 can include and/or be associated with binary emulation metadata 108a. As will be detailed later, this metadata 108a might be part of the output binary 108 itself. In these embodiments, at least a portion of the metadata 108a could be contained within a stream of machine code instructions (e.g., as no-op instructions and/or pseudo-instructions). Additionally, or alternatively, at least a portion of the metadata 108a could be contained within data structures, such as tables, contained in the output binary 108 and referenced by a binary header. In additional or alternative embodiments, at least a portion of the metadata 108a could be contained in a file that is entirely separate from the output binary 108.

Each of compiler toolchain 106, source code file(s) 107, and output binary 108 (including metadata 108a) are shown as being resident in system memory 105 (i.e., as compiler toolchain 106', source code file(s) 107', output binary 108', and metadata 108a'). For example, as part of compiling source code 107 the processor 102 can load the source code 107 and the compiler toolchain 106 from data store 104 into system memory 105. As the compiler toolchain 106' executes at the processor 102 and operates on the source code 107', it can generate the output binary 108' and the binary emulation metadata 108a', which might later be persisted to the data store 104. It will be appreciated by those of ordinary skill in the art that the entirety of these programs and data need not be resident, in their entirety, in system memory 105 at the same time.

As shown within compiler toolchain 106', the compiler toolchain 106 can include a variety of components including, for example, a parser 109, a code generator 110, a metadata generator 111, and a binary generator 112. These components 109-112 could be implemented by a single program in a compiler toolchain or could be implemented by multiple programs in a compiler toolchain. The illustrated components 109-112 have been chosen merely as an aid in describing the embodiments herein (i.e., as symbolically representing various functionality that might be part of the compiler toolchain 106), and it will be appreciated by those of ordinary skill in the art that these components 109-112 are only one choice of an arrangement of components for accomplishing the described functionality. Additionally, these components 109-112 may only represent a subset of the components of a compiler toolchain.

The parser 109 represents functionality for parsing and performing lexical analysis of source code 107. In general, the parser 109 performs analysis of input source code for syntactical correctness and converts that source code into data, such as tokens, that can be understood by the code generator. In some embodiments, the parser 109 may also do source code preprocessing, such as to transform the source code based on compiler macros included in the source code. The particular actions carried out the parser 109 can vary widely depending on implementation choices, source code programming language, and/or compiler type. However, in embodiments, as part of performing its parsing/lexical analysis, the parser 109 can recognize source code annotations that indicate memory ordering constraints, such as keywords and/or intrinsics in program source code and/or compiler macros. The parser 109 can then make these memory ordering constraints known to other compiler toolchain 106 components, such as code generator 110, metadata generator 111, and/or binary generator 112.

In general, code generator 110 generates machine code instructions based on the output (e.g., tokens) generated by the parser 109. The code generator 110 can generate machine code instructions into any form that is appropriate for the programming language, and/or compiler type. However, in some embodiments (such as those described later in connection with FIG. 2) the code generator 110 generates machine code instructions in the form of one or more object files. For example, the object file(s) might be an intermediate format that addresses each generated machine code instruction symbolically (e.g., using offsets relative to the beginning of each function) their data might be stored in one or both of the system memory 105 or the data store 104 during the compilation process.

During generation of machine code instructions, the code generator 110 can interoperate with the metadata generator 111 in order to generate binary emulation metadata for generated machine code instruction(s) that honor memory ordering constraints that were specified in the source code 107, and that were identified by the parser 109. The metadata generated by metadata generator 111 can be separate from the generated machine code instructions, and/or could be embodied within the generated machine code instructions, themselves. The generated binary emulation metadata might be stored in one or both of the system memory 105 or the data store 104 during the compilation process.

As was mentioned, memory ordering constraints might be specified as source code annotations (e.g., a keyword, such as 'volatile' in C/C++ that is applicable to one or more lines of source code). In these embodiments, those annotated line(s) of source code might be compiled, by the code generator 110, into one or more corresponding machine code instructions. In this situation, the generated binary emulation metadata might comprise metadata that is referenced to these generated machine code instruction(s), and which identifies the memory ordering constraint(s) that were identified in the original source code annotations.

As was also mentioned, memory ordering constraints might be specified as calls to intrinsic functions. An intrinsic function may cause a compiler to generate corresponding machine code instructions. As will be appreciated by those of ordinary skill in the art, an intrinsic function may be used to specify constraints on one or more source code statements that are in proximity to the intrinsic function. For example, an intrinsic function might specify a constraint on a single statement following the intrinsic function, or multiple statements following the intrinsic function (e.g., as a critical section). As such, the intrinsic function need not, itself, normally cause a compiler to generate any corresponding machine code instructions. In embodiments, the code generator 110 and/or metadata generator 111 capture memory ordering constraints that were specified by an intrinsic function by inserting one or more no-op instructions and/or pseudo-instructions into the generated machine code instructions.

In embodiments, these no-op/pseudo-instructions are not actually executed by a processor implementing the target processor ISA. Instead, a no-op/pseudo-instruction might communicate one or more memory ordering constraints to a binary emulator by virtue of the particular type (e.g., opcode value) of the no-op/pseudo-instruction. Additionally, or alternatively, the metadata generator 111 might generate binary emulation metadata that identifies the memory ordering constraint(s) that were imposed by an intrinsic function and associate this binary emulation metadata with a corresponding no-op/pseudo-instruction (e.g., similar to the binary emulation metadata discussed above in connection with annotation keywords). In this second embodiment, the no-op/pseudo-instructions might serve as a code "placeholder" that provides at least one instruction memory address to which binary emulation metadata can be referenced. In embodiments, the no-op/pseudo-instructions might be used to reference a series of machine code instructions (e.g., a block beginning with the no-op/pseudo-instruction, a function following the no-op/pseudo-instruction, etc.).

It is noted that, while the use of no-op/pseudo-instructions was introduced in connection with capturing the memory ordering constraints specified by intrinsic functions, their use is not limited to intrinsic functions. For example, in the case of annotation keywords, some implementations might capture memory ordering constraints through insertion of no-op/pseudo-instructions, rather than associating generated machine code instructions with corresponding binary emulation metadata.

Notably, the binary emulation metadata generated by the metadata generator 111 can be stored in any appropriate location, which could vary widely depending on implementation. For example, some implementations (such as the one discussed in connection with FIG. 2) might initially store binary emulation metadata within object files during the compilation process. However, this binary emulation metadata could be stored in practically any location, such as in one or more separate metadata files, in one or more separate in-memory metadata data structures, etc.

The binary generator 112 generates at least one output executable image (e.g., output binary 108') that is executable at a processor implementing the target ISA. In general, the binary generator 112 creates an output file that includes a header that identifies the locations of various program elements (e.g., code, data, etc.) within the output file, and that provides information about how to load those program elements into memory for execution. For example, binary generator 112 might generate an output executable image adhering to the PE and/or ELF header formats. In some implementations the binary generator 112 might comprise a linker that gathers symbolically-referenced executable instructions from a plurality of object files into a stream of executable instructions referenced by instruction memory address.

Depending on where the particular implementation stores binary emulation metadata, the binary generator 112 might store all, or part, of the binary emulation metadata within the output executable image, itself. This implementation is depicted in FIG. 1 as metadata 108a' within output binary 108'. In this implementation, the binary emulation metadata might be referenced to machine code instructions based on instruction memory address. As such, during emulation of output binary 108, an emulator might identify appropriate portions of binary emulation metadata 108a based on a lookup by instruction memory address. Notably, in implementations in which binary emulation metadata 108 is stored within an output binary 108, some of that metadata 108 might take the form of no-op/pseudo-instructions within a stream of machine code instructions, while other binary emulation metadata 108a could be stored within some other data structure(s) within the output binary 108.

Other implementations could store the binary emulation metadata 108a in entirely separate files, or entirely within the stream of machine code instructions, themselves (e.g., as no-op/pseudo-instructions). Combinations are also possible. For example, some binary emulation metadata 108a could be stored as within a stream of machine code instructions (e.g., as no-op/pseudo-instructions) inside an output binary 108, while other binary emulation metadata 108a could be stored within a separate file.

Figure 2:
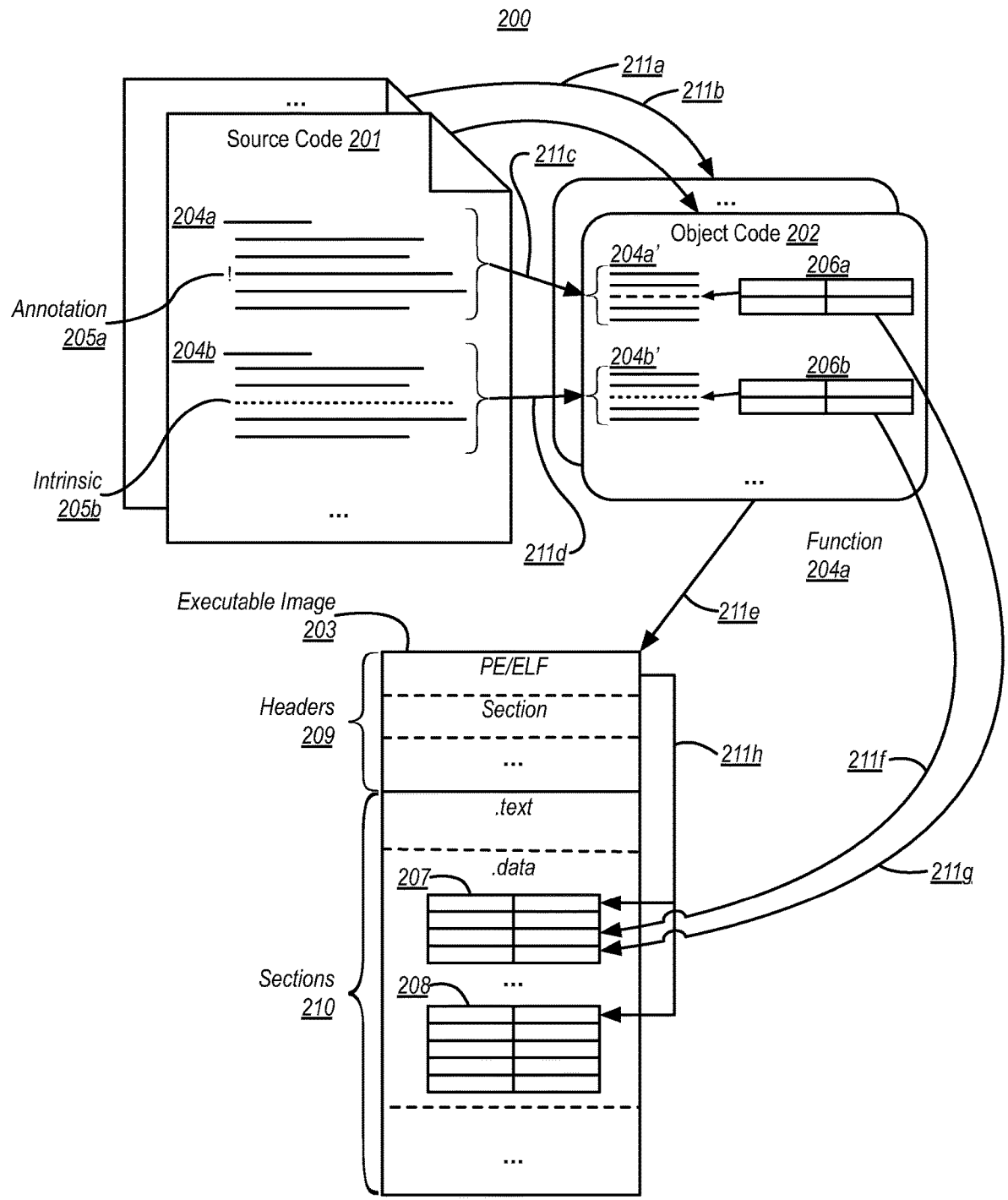
FIG. 2 illustrates an example of generating and preserving binary emulation metadata during code compilation.

FIG. 2 illustrates one more concrete example 200 of generating and preserving binary emulation metadata during code compilation, in which binary emulation metadata is stored within an output binary, itself. Example 200 is just one example of how binary emulation metadata could be generated and preserved, and it will be recognized that there many other ways in which a particular implementation of the embodiments herein could generate and preserve binary emulation metadata.

In general, FIG. 2 depicts one or more input source code file(s) 201 (referred to as source code 201) that are an input to compiler toolchain 106, one or more intermediary object code file(s) 202 (referred to as object code 202) that are generated by code generator 110 from the source code 201, and an output executable image 203 that is generated by the binary generator 112 from the object code 202. FIG. 2 symbolically represents two functions 204a and 204b within the source code 201. Within these functions 204a, 204b, FIG. 2 symbolically represents an annotation 205a (e.g., an annotation keyword, such as 'volatile' in C/C++) as an explanation point, and symbolically represents an intrinsic 205b (e.g., an intrinsic function call, such as '_ReadWriteBarrier' in VISUAL C++) as a short-dashed line of source code. Both annotation 205a and intrinsic 205b represent developer-specified memory ordering constraints. For example, annotation 205a might define an ordering constraint on one or more corresponding source code statements, while intrinsic 205b might define an ordering constraint on one or more source code statements following the intrinsic.

As shown by arrows 211a and 211b, the compiler toolchain 106 generates object code 202 from the source code 201 (e.g., one object code file for each source code file). Arrow 211c shows that compiler toolchain 106 can generate a block 204a' of machine code instructions from the source code of function 204a, and arrow 211d shows that compiler toolchain 106 can also generate a block 204b' of machine code instructions from the source code of function 204b. In embodiments, these machine code instructions are represented within object code 202 symbolically, such as by using offsets from the beginning of each block (i.e., corresponding to the beginning of each function). The long-dashed line within block 204a' represents a particular machine code instruction that was generated from the source code statement(s) corresponding to annotation 205a. The short-dashed line within block 204b', on the other hand, represents a particular instruction that is a no-op/pseudo-instruction that was generated from the intrinsic 205b.

Object code 202 also includes two data structures 206a and 206b. These data structures are shown in FIG. 2 as tables, though they could take any appropriate data structure format. These data structures 206a, 206b represent metadata generated by metadata generator 111 for each block 204a', 204b' of machine code instructions. As shown, data structure 206a includes a metadata portion that references the long-dashed machine code instruction in block 204a', while data structure 206b includes a metadata portion that references the short-dashed machine code instruction in block 204a'.

In embodiments, data structures 206a, 206b can be viewed as comprising memory ordering metadata, and are thus referred to herein as "memory ordering tables." In embodiments, these memory ordering tables contain entries that each identify a machine code instruction by its offset. These memory ordering tables might also identify a particular type of memory ordering constraint, such as a read barrier, a write barrier, or a read/write barrier. In some embodiments, the type of memory ordering constraint is omitted, and each entry is treated as a read/write barrier.

As shown by arrow 211e, the binary generator 112 generates executable image 203 from the object code 202. As depicted, the executable image 203 might include headers 203 and different sections 210. For example, executable image 203 might contain a PE or ELF header, a section header, etc. Executable image 203 might also contain a .text section, a .data section, etc. Notably, the headers 209 and the sections 210 need not occur in the order depicted and could be interspersed. In implementations, one or more of the headers 203 (e.g., the section header) can identify the available sections 210 and specify how these sections are to be loaded into memory for execution. In implementations, the .text section can comprise the machine code instructions from the various object code files 202, with these instructions now being referenced by instruction memory address. The .data section, on the other hand, can comprise program data such as variable values, constants, and other data used by the machine code instructions.

As shown by arrows 211f and 211g, in example 200 the data structures 206a, 206b from the object code 202 are combined and inserted into one or more of the executable image's sections 210. For instance, in the example 200 of FIG. 2, data structure 207 (which aggregates data structures 206a, 206b) is shown in the executable image's .data section. Implementations may choose to include binary emulation metadata within a variety of one or more sections of an executable image. For example, use of a .data section (as in FIG. 2) may be beneficial for data availability (i.e., the metadata might load and stay resident in memory, even the original target architecture), but the metadata then occupies memory even on machines that don't actually utilize the metadata. To reduce memory usage, alternative implementations might choose a section that is discarded by the original target architecture's binary loader, to thus reclaim the memory space of occupied by the binary emulation metadata.

Data structure 207 can be viewed as a memory ordering table that contains the aggregate of the memory ordering tables from the object code 202. Similar to the tables discussed above in connection with the object code 202, each entry in data structure 207 might identify a particular type of memory ordering constraint, such as a read barrier, a write barrier, or a read/write barrier. In implementations, the entries in data structure 207 reference corresponding machine code instruction by instruction memory address. As shown by arrow 211h data structure 207 might be identified by one or more of the headers 209.

Executable image 203 could include additional binary emulation metadata generated by the metadata generator 111 in connection with operation of the binary generator 112. For example, Figure to also illustrates data structure 208 within executable image 203. In embodiments, data structure 208 comprises instruction memory address range information, and thus could be viewed as a "range table." In particular, data structure 208 can identify which range(s) of memory addresses are covered by the machine code instructions that were generated by a compiler that also creates binary emulation metadata. As shown by arrow 211h data structure 208 might also be identified by one or more of the headers 209.

Data structure 208 can be useful when executable image 203 contains machine code instructions that originate from sources other than object code 202, such as from statically-linked shared libraries. In these situations, data structure 208 can be used by a binary emulator to determine, for each instruction memory address, whether corresponding binary emulation metadata is available for that instruction memory address. If a given instruction memory address is covered by a range specified in data structure 208, then the binary emulator might proceed to query data structure 207. Otherwise, if the instruction memory address is not covered by a range specified in data structure 208, then the binary emulator might determine no binary emulation metadata is available for that address and thus pessimistically emit memory barriers as appropriate.

Notably, some embodiments could indicate (either explicitly or implicitly) that one or more blocks of one or more machine code instructions lack corresponding binary emulation metadata (e.g., such as data structure(s) 206a, 206b, and/or data structure 207). These indications could be present during any phase of the compilation, such as in object files and/or in the resulting executable image. These indications could be made, for example, using no-op/pseudo instructions, additional metadata stored within object code and/or in the resulting executable image, etc. These indications could be helpful, for example, to avoid searches for binary emulation metadata during code emulation, and/or to ensure that an emulator treats these block(s) of instruction(s) pessimistically—such as by emitting memory barriers.

Figure 3:
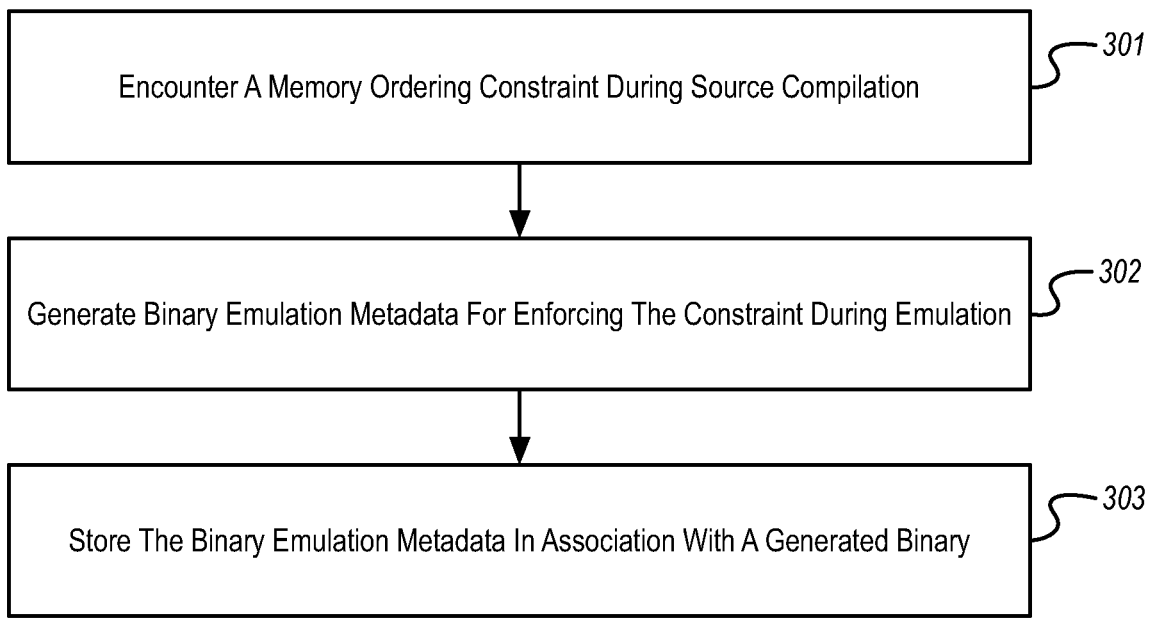
FIG. 3 illustrates a flow chart of an example method for generating binary emulation metadata during source code compilation.

In view of the foregoing discussion of FIGS. 1 and 2, FIG. 3 illustrates an example flowchart of an example method 300 for generating binary emulation metadata during source code compilation. Method 300 will be described in connection with the computer architecture 100 of FIG. 1 and the example 200 of FIG. 2.

As shown in FIG. 3, method 300 includes an act 301 of encountering a memory ordering constraint during source compilation. In some embodiments, act 301 comprises, during compilation of source code into a plurality of first machine code instructions of a first processor ISA, encountering a memory ordering constraint specified in the source code. For example, during compilation of source code 107 by compiler toolchain 106, the parser 109 might identify an annotation keyword and/or an intrinsic function that signals a memory ordering constraint. The identity of this memory ordering constraint can then be passed to the code generator 110, which generates machine code instructions.

A more concrete example of act 301 is depicted in FIG. 2, in which source code 201 includes an annotation 205a and an intrinsic 205b. This, in the context of example 200, act 301 might comprise the parser 109 identifying one or both of annotation 205a or intrinsic 205b in source code 201. Additionally, or alternatively, act 301 might comprise the code generator 110 identifying one or both of annotation 205a or intrinsic 205b (and/or the memory constraint(s) specified by annotation 205a and/or intrinsic 205b) from data (e.g., tokens) received from the parser 109 as it generates machine code instructions 204a', 204b'.

In view of the discussion of FIGS. 1 and 2, it will be appreciated that, in act 301, the memory ordering constraint could comprise an annotation keyword affecting at least one of a memory read or a memory write specified in the source code. Additionally, or alternatively, in act 301, the memory ordering constraint could comprise an intrinsic affecting at least one statement of the source code.

Returning to FIG. 3, method 300 also includes an act 302 of generating binary emulation metadata for enforcing the constraint during emulation. In some embodiments, act 302 comprises, based on encountering the memory ordering constraint, generating binary emulation metadata that is usable during emulation of at least one of the plurality of first machine code instructions on a second processor ISA, to enforce the memory ordering constraint within corresponding second machine code instructions of the second processor ISA. For example, in connection with the code generator 110 generating machine code instructions, the metadata generator 111 can generate binary emulation metadata. This metadata might take the form of machine code instructions, themselves (e.g., no-op/pseudo-instructions) and/or the metadata might take the form of metadata referenced to generated machine code instructions. This generated binary emulation metadata could be stored in a location in system memory 105 and/or in data store 104, and it could be stored in any appropriate data format.

As one example only, and returning to the example 200 of FIG. 2, act 302 might comprise the metadata generator 111 generating data structures 206a, 206b (e.g., memory ordering tables) within object code 202. Thus, in the context of example 200 of FIG. 2, it will be appreciated that, in act 302, generating the binary emulation metadata might comprise, during a compilation phase, generating a memory ordering structure within an object file, the memory ordering structure associating generated first instructions with ordering constraints. As discussed, this memory ordering structure might reference the generated first instructions symbolically.

Method 300 also includes an act 303 of storing the binary emulation metadata in association with a generated binary. In some embodiments, act 303 comprises storing the generated binary emulation metadata in association with the plurality of first machine code instructions. For example, the binary generator 112 can generate one or more executable images (e.g., output binary 108') from the machine code instructions generated by the code generator 110 and can store the executable image(s) to durable storage (e.g., output binary 108). In connection with this, the metadata generator 111 can generate finalized binary emulation metadata (e.g., metadata 108a') and store this metadata to durable storage in association with the executable image(s) (e.g., metadata 108a). As discussed, this binary emulation metadata could be stored in whole, or in part, within the executable image(s) (e.g., as no-op/pseudo-instructions within a code stream and/or as metadata structures). Additionally, or alternatively, this binary emulation metadata could be stored in whole, or in part, in one or more files that are distinct from the executable image(s).

For example, returning again to the example 200 of FIG. 2, the binary emulation metadata stored in data structures 206a, 206b within object code might be combined into an aggregate data structure 207 within the executable image 203. Thus, for example, act 303 might comprise the metadata generator 111 generating data structure 207 within executable image 203. In this case, act 303 might include, during a linking phase, combining memory ordering structures from a plurality of object files into a single memory ordering structure within an executable image, and wherein the memory ordering structure within the executable image references generated first instructions by instruction memory address.

More generally, in act 303, storing the generated binary emulation metadata in association with the plurality of first machine code instructions might comprise storing at least part of the binary emulation metadata within an executable image that includes the plurality of first machine code instructions. In this embodiment, the binary emulation metadata could comprise a data structure (e.g., data structure 207) that associates instruction memory addresses that perform memory operations that have ordering constraints. Additionally, the binary emulation metadata might comprise a data structure (e.g., data structure 208) that identifies one or more ranges of instruction addresses corresponding to the plurality of first machine code instructions. Any of this binary emulation metadata could be referenced by a header of the executable image. As discussed, this could comprise a PE header, an ELF header, or the like.

While, in the foregoing example, binary emulation metadata might be stored only in data structures (e.g., data structure 207), in other embodiments it might also be stored (at least in part) in a code stream, itself. Thus, the generated binary emulation metadata could include at least one no-op (or pseudo) instruction that is emitted into an instruction stream comprising the plurality of first machine code instructions (and in which this instruction is not executed by processors implementing the first processor ISA). In this case, the generated binary emulation metadata could also include a data structure (e.g., data structure 207) that associates an instruction memory address for the no-op (or pseudo) instruction with the memory ordering constraint.

Additionally, or alternatively, in act 303 storing the generated binary emulation metadata in association with the plurality of first machine code instructions could comprise storing at least part of the binary emulation metadata as a separate file than an executable image that includes the plurality of first machine code instructions.

Notably, while the embodiments described thus far have focused on generating binary emulation metadata based on encountering a source code annotation and/or an intrinsic, some embodiments might generate binary emulation metadata in a variety of situation in which knowledge of a memory ordering constraint is lost during code compilation. For example, generation of binary emulation metadata could be triggered in situations such as (i) when a compiler relies on a target processor ISA having an implied memory ordering constraint, (ii) when a compiler excludes a memory ordering constraint that exists in source code from corresponding generated instructions for the target processor ISA, (iii) when a compiler converts a generated code block (e.g., one or more generated instructions) that includes a memory ordering constraint into corresponding generated instructions that exclude the memory ordering constraint, and the like.

Accordingly, embodiments described above modify a compiler so that it retains developer-specified memory ordering constraints, by causing the compiler to generate metadata during compilation of source code to first machine code instructions of a first processor ISA. This metadata captures memory ordering constraints that were specified in source code annotations, but which are often not expressly emitted into the first machine code instructions, themselves. This metadata can be stored within a resulting binary, itself, and/or as part of some separate file. While these embodiments retain developer-specified memory ordering constraints, other embodiments can use this generated metadata during emulation of the resulting binary on a target processor having a second processor ISA, in order to ensure that instructions executed on the target processor honor the developer-specified memory ordering constraints originally specified in the source code.

Figure 4:
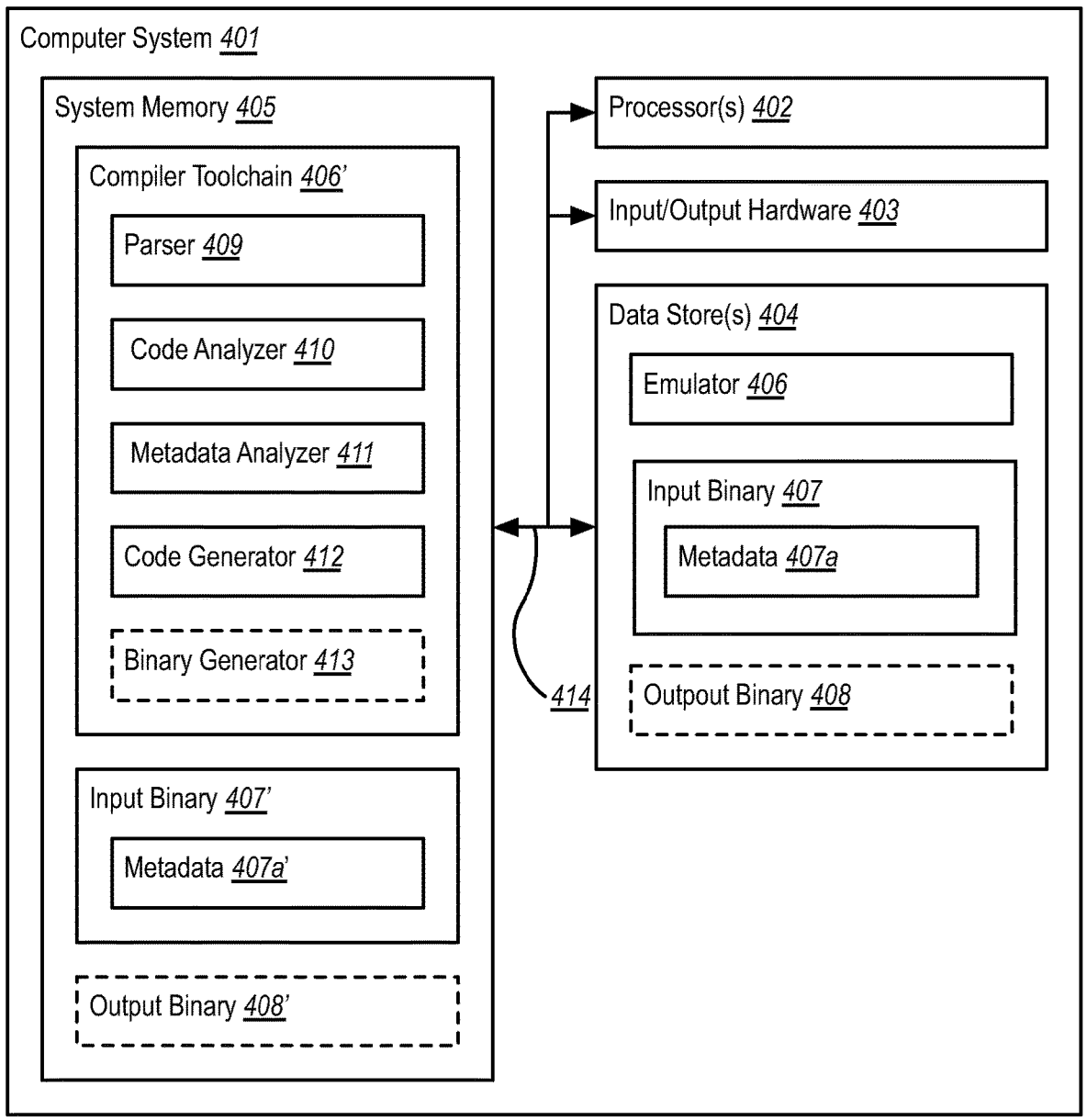
FIG. 4 illustrates an example computer architecture that facilitates utilizing binary emulation metadata associated with an executable image during binary emulation of the executable image from a first processor ISA to a second processor ISA.

For example, FIG. 4 illustrates an example computer architecture 400 that facilitates utilizing binary emulation metadata (e.g., metadata 108a) associated with an executable image (e.g., output binary 108) during binary emulation of the executable image from a first processor ISA to a second processor ISA. As shown, computer system 401 includes one or more processor(s) 402 (also referred to more concisely herein as processor 402), input/output hardware 403 (e.g., display, user input, networking, etc.), one or more data store(s) 404 (also referred to more concisely herein as data store 404), and system memory 405. As indicated by arrows 414, each of these components can be communicatively interconnected such as by a bus.

The processor 402 of computer system 401 may implement any processor architecture, such as x86, ARM, etc. While processor 402 might typically implement a second processor ISA that is different from the first processor ISA that was targeted by compiler toolchain 106 of FIG. 1, this does not necessarily need to be the case. However, in embodiments, the processor 402 implements a relatively weakly-ordered ISA (e.g. such as ARM) as compared to the processor ISA that was targeted by compiler toolchain 106.

As shown, the data store 404 can store a variety of programs and data, such as the illustrated binary emulator 406 and an input binary 407, such as output binary 108 of FIG. 1. The emulator 406 comprises one or more programs that are executable by the processor 402 in order to convert first machine code instructions of the first processor ISA that are contained in input binary 407 into corresponding second machine code instructions of a target processor ISA. In some implementations, this target processor ISA may be the second processor ISA that is implemented by processor 402. The emulator 406 might cause those second machine code instructions to be executed at processor 402, if processor 402 implements the target processor ISA. Additionally, or alternatively, the emulator 406 might package the second machine code instructions into an output binary 408 that is executable on processors implementing the target processor ISA (e.g., such as processor 402 or at some other computer system).

As shown, the input binary 407 includes and/or is associated with binary emulation metadata 407a, such as metadata 108a of FIG. 1. This metadata 407a is usable during emulation of the input binary 407 by emulator 406, in order to enforce memory ordering constraints that were specified in source code (e.g., source code 107) that was used to produce the input binary 407, even though this source code is not available to computer system 401. For example, based on emulation metadata 407a, emulator 406 might insert one or more "barriered" instructions into the second machine code instructions in order to enforce these memory ordering constraints.

As will be appreciated by one of ordinary skill in the art, a "barriered" instruction is either (i) one or more instruction(s) that impose an ordering constraint on the memory operation(s) defined by the instruction, or (ii) a plurality of instructions including one or more first instructions that imposes no ordering constraints on the memory operation(s) defined by the instruction(s), along with one or more second instructions that cause an ordering constraint on the first instruction(s). In embodiments, the second instruction(s) comprise one or more "fence" instructions. Many processor architectures define memory barrier/fence instructions, and the emulator 406 can choose an appropriate instruction that is available in the target processor ISA. Note that the one or more first instructions and the one or more second instructions may be emitted in different orders, depending on the target ISA (for example, the one or more second instructions may be emitted prior to the one or more first instructions).

As will be also be appreciated by one of ordinary skill in the art, some processor architectures may offer a variety of instructions that perform memory operations, and may include ordering-constrained and ordering-unconstrained variations of the same type of operation. Thus, when inserting a barriered instruction that performs a memory operation, the emulator 406 could choose a constrained version. If the processor architecture lacks such variations (e.g. only has unconstrained types), then when inserting a barriered instruction the emulator 4096 could emit the available unconstrained type, along with an additional fence.

Each of emulator 406, input binary 407 (including metadata 407a), and output binary 408 are shown as being resident in system memory 405 (i.e., as emulator 406', input binary 407', metadata 407a', and output binary 408'. For example, as part of emulating input binary 407, the processor 402 can load the emulator 406, the input binary 407, and the metadata 407a from data store 404 into system memory 405. As the emulator 406' executes at the processor 402 and operates on the first machine code instructions from input binary 407 using metadata 407a, it can generate second machine code instructions of the target ISA. The emulator 406' might also generate output binary 408' using those second machine code instructions, which might later be persisted to the data store 404. It will be appreciated by those of ordinary skill in the art that the entirety of these programs and data need not be resident, in their entirety, in system memory 405 at the same time.

As shown within emulator 406', the emulator 406 can include a variety of components including, for example, a parser 409, a code analyzer 410, a metadata analyzer 411, a code generator 412, and a binary generator 413. These components 409-413 could be implemented by a single program or could be implemented by multiple programs. The illustrated components 409-413 have been chosen merely as an aid in describing the embodiments herein (i.e., as symbolically representing various functionality that might be part of the emulator 406), and it will be appreciated by those of ordinary skill in the art that these components 409-413 are only one choice of an arrangement of components for accomplishing the described functionality. Additionally, these components 409-413 may only represent a subset of the components of a binary emulator.

The parser 409 represents functionality for parsing the input binary 407 and/or the binary emulation metadata 407a. This may include, for example, loading the input binary 407 into system memory 405 according to header information (e.g., PE, ELF) contained in the input binary 407 for analysis by the code analyzer 410, and/or loading the emulation metadata 407a into memory for analysis by the metadata analyzer 411.

The code analyzer 410 analyzes the first machine code instructions in the first ISA to gain an understanding of their function. This understanding enables the code generator 412 to later generate the corresponding second machine code instructions in the target ISA. The code analyzer 410 can work in conjunction with the metadata analyzer 411. For example, when the code analyzer 410 considers a given first machine code instruction, it can leverage the metadata analyzer 411 to determine if a corresponding metadata portion exists within one or more data structures (e.g., data structure 407) in binary emulation metadata 407a. Additionally, or alternatively, when the code analyzer 410 considers a given first machine code instruction, it can leverage the metadata analyzer 411 to determine if the instruction, itself, comprises a portion of binary emulation metadata (e.g., as a no-op/pseudo-instruction).

Based on the analysis of the code analyzer 410 and/or metadata analyzer 411, the code generator 412 can generate second machine code instructions in the target ISA that perform the same type of functionality as the first machine code instructions. When doing so, the code generator 412 can insert barrier instructions, as necessary, to honor memory ordering constraints that were captured by the binary emulation metadata 407a.

In some implementations, and when the processor 402 implements the target ISA, the parser 409, code analyzer 410, metadata analyzer 411, and code generator 412 can work in conjunction to emulate the input binary 407 substantially in real-time—i.e., the emulator 406 can execute the second machine code instructions on the processor 402 as they are generated. Thus, in this configuration, the emulator 406 can function as an interpreter that does a live conversion of the input binary 407 into appropriate second machine code instructions as it is processed by emulator 406. In this configuration, the emulator 406 might act as a state machine, tracking various program state such as register values, etc. as it performs the interpretation. As an option, the emulator 406 might use the binary generator 413 to generate an output binary 408' in-memory, and persist it to data store 404 (i.e., as output binary 408) for later use.

In other implementations, the parser 409, code analyzer 410, metadata analyzer 411, and code generator 412 process the input binary 407 and generate second machine code instructions, but the emulator 406 does not execute these second machine code instructions on the processor 402 as they are generated. Instead, it uses binary generator 413 to generate an output binary 408' in-memory, and then persist it to data store 404 (i.e., as output binary 408). Thus, in this configuration, the emulator 406 can function as translator that converts the input binary 407 into an output binary 408 that is compatible with processors that implement the target ISA. In this configuration, the emulator 406 might perform the translation work based on a static analysis of the input binary 407. Notably, when doing binary translation, the processor 402 might actually implement an ISA this is different from the target ISA.

Figure 5:
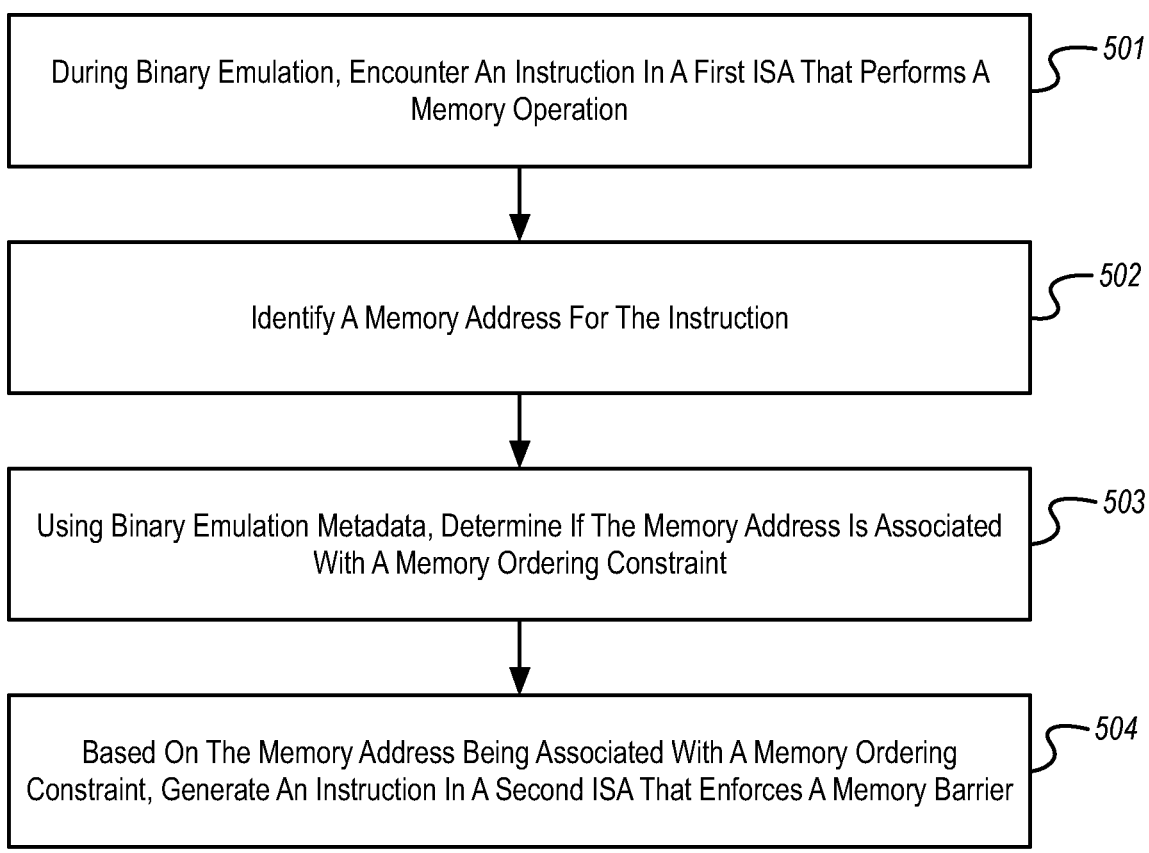
FIG. 5 illustrates a flow chart of an example method for utilizing binary emulation metadata associated with an executable image during binary emulation of the executable image from a first processor ISA to a second processor ISA.

In view of the foregoing discussion of FIG. 4, FIG. 5 illustrates an example flowchart of an example method 500 for utilizing binary emulation metadata associated with an executable image during binary emulation of the executable image from a first processor ISA to a second processor ISA. Method 500 will be described primarily in connection with the computer architecture 400 of FIG. 4 and the example 200 of FIG. 2.

As shown in FIG. 5, method 500 includes an act 501 of, during binary emulation, encountering an instruction in a first ISA that performs a memory operation. In some embodiments, act 501 comprises, during emulation by the one or more processors of a plurality of first machine code instructions of the first processor ISA contained in the executable image, encountering a particular first machine code instruction of the plurality of first machine code instructions that performs a memory operation. For example, while emulator 406 operates on input binary 407, the code analyzer 410 might encounter an instruction that performs a memory operation. If the input binary 407 is the executable image 203 of FIG. 2, for example, the code analyzer 410 might encounter an instruction that was loaded from the .text section of the image that corresponds to the long-dashed instruction in block 204a' (i.e., corresponding to annotation 205a), or that corresponds to the short-dashed instruction in block 204b' (i.e., corresponding to intrinsic 205b).

Method 500 also includes an act 502 of identifying a memory address for the instruction. In some embodiments, act 502 comprises identifying an instruction memory address corresponding to the particular first machine code instruction. For example, the code analyzer 410 can identify an instruction memory address of the instruction identified in act 501. If the input binary 407 is the executable image 203 of FIG. 2, for instance, the code analyzer 410 can identify the instruction memory address the instruction that was loaded from the .text section of the image that corresponds to the long-dashed instruction in block 204a' (i.e., corresponding to annotation 205a), or that corresponds to the short-dashed instruction (e.g., a no-op/pseudo-instruction) in block 204b' (i.e., corresponding to intrinsic 205b).

Method 500 also includes an act 503 of, using binary emulation metadata, determining if the memory address is associated with a memory ordering constraint. In some embodiments, act 503 comprises determining whether the binary emulation metadata associated with the executable image identifies the instruction memory address as being associated with a memory ordering constraint. For example, the code analyzer 410 might call the metadata analyzer 411, which can consult metadata 407*a*' that is associated with the input binary 407. If the input binary 407 is the executable image 203 of FIG. 2, for instance, the metadata analyzer 411 might consult data structure 207 (e.g., a memory ordering table) to determine if there is a memory ordering constraint specified for the instruction memory address. Prior to doing so, the metadata analyzer 411 might ensure that the instruction memory is covered by at least one range specified in data structure 208 (e.g., a range table).

Method 500 also includes an act 504 of, based on the memory address being associated with a memory ordering constraint, generate an instruction in a second ISA that enforces a memory barrier. In some embodiments, act 504 comprises, based at least on determining, from the binary emulation metadata, that the instruction memory address is associated with a memory ordering constraint, emitting one or more second machine code instructions in the second processor ISA that perform the memory operation using a memory barrier. For example, metadata analyzer 411 might determine that the instruction memory address is associated with an ordering constraint. Based on this determination, the code generator 412 can generate one or more barrier instructions in a target processor ISA that enforce that ordering constraint.

For instance, if the input binary 407 is the executable image 203 of FIG. 2, and if the subject instruction is the long-dashed instruction (i.e., corresponding to annotation 205*a*), then the code generator 412 might (i) generate an instruction in the target ISA that performs the memory operation, along with a fence instruction; or (ii) select an ordering-constrained instruction in the target ISA that performs the memory operation. On the other hand, if the input binary 407 is the executable image 203 of FIG. 2, and if the subject instruction is the short-dashed instruction (i.e., a no-op/pseudo instruction corresponding to intrinsic 205*b*), then the code generator 412 might generate a barrier for an instruction or code block proximate to (e.g., before or after) the short-dashed instruction.

As discussed in connection with FIG. 4, emulator 406 can emulate an input binary live or perform an offline translation. As such, in method 500, the emulation could comprise at least one of translation or interpretation. In either case, the processors implementing method 400 could implement the second processor ISA and could be used to execute the emitted one or more second machine code instructions. As was discussed throughout, binary emulation metadata could be stored within a binary and/or in a separate file. As such, in method 500, the binary emulation metadata could be contained within the executable image, and/or could be contained within a file that is separate from the executable image.

Accordingly, in addition to modifying a compiler so that it retains developer-specified memory ordering constraints (i.e., by causing the compiler to generate metadata during compilation of source code to first machine code instructions of a first processor ISA that captures memory ordering constraints that were specified source code annotations), embodiments can also use this generated metadata during emulation of the resulting binary on a target processor having a second processor ISA, in order to ensure that instructions executed on the target processor honor the developer-specified memory ordering constraints originally specified in the source code.

As discussed, each of the foregoing embodiments can be used to improve the performance of the binary emulation process, can improve execution performance of the emulated binary at the target processor, and can reduce translated binary size. These benefits become especially apparent when the second processor ISA (e.g., ARM) has a weaker memory model than the first processor ISA (e.g., x86). This is because the embodiments herein enable an emulator to granularly emit memory barriers for execution on a target processor based on the memory ordering constraints originally specified in the source code used to generate an input binary that is being emulated, rather than to pessimistically emit memory barriers for all memory operations.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for generating binary emulation metadata during source code compilation, the method comprising:
   during compilation of source code into a plurality of first machine code instructions of a first processor Instruction Set Architecture (ISA), encountering a memory ordering constraint specified in the source code;
   based on encountering the memory ordering constraint, generating, during the compilation, binary emulation metadata that is configured to be used during emulation of one or more of the plurality of first machine code instructions on a second processor ISA to enforce the memory ordering constraint within one or more corresponding second machine code instructions of the second processor ISA, wherein the generated binary emulation metadata includes a memory ordering data structure that associates a corresponding instruction memory address of each of the one or more of the plurality of first machine code instructions with at least one of a read barrier or a write barrier; and
   storing the generated binary emulation metadata in association with the plurality of first machine code instructions, including storing the memory ordering data structure separate from an instruction stream comprising the plurality of first machine code instructions.

2. The method as recited in claim 1, wherein the memory ordering constraint comprises an annotation keyword affecting at least one of a memory read or a memory write specified in the source code.

3. The method as recited in claim 1, wherein the memory ordering constraint comprises an intrinsic affecting at least one statement or at least one code block of source code.

4. The method as recited in claim 1, wherein storing the generated binary emulation metadata in association with the plurality of first machine code instructions comprises storing at least part of the binary emulation metadata within an executable image that includes the plurality of first machine code instructions.

5. The method as recited in claim 4, wherein the generated binary emulation metadata also includes a range data structure that identifies one or more ranges of instruction addresses corresponding to the plurality of first machine code instructions.

6. The method as recited in claim 4, wherein the generated binary emulation metadata is referenced by a header of the executable image.

7. The method as recited in claim 6, wherein the header of the executable image comprises one of a Portable Executable (PE) header or an Executable and Linkable Format (ELF) header.

8. The method as recited in claim 4, wherein the generated binary emulation metadata also includes at least one no-operation (no-op) instruction that is emitted into the instruction stream comprising the plurality of first machine code instructions, and wherein the memory ordering data structure associates an instruction memory address for the no-op instruction with at least one of the read barrier or the write barrier.

9. The method as recited in claim 1, wherein storing the generated binary emulation metadata in association with the plurality of first machine code instructions comprises storing at least part of the binary emulation metadata as a separate file than an executable image that includes the plurality of first machine code instructions.

10. The method as recited in claim 1, wherein storing the generated binary emulation metadata in association with the plurality of first machine code instructions comprises storing at least part of the binary emulation metadata within instruction stream comprising the plurality of first machine code instructions.

11. The method as recited in claim 10, wherein the at least part of the generated binary emulation metadata is stored as at least one of a no-operation (no-op) instruction or a pseudo-instruction that is not executed by processors implementing the first processor ISA.

12. The method as recited in claim 1, wherein generating the binary emulation metadata comprises:
during a compilation phase, generating an intermediary memory ordering data structure within an object file; and
during a linking phase, combining intermediary memory ordering dat structures from a plurality of object files into the memory ordering data structure within an executable image.

13. The method as recited in claim 12, wherein the intermediary memory ordering data structure within the object file references generated first instructions symbolically, and wherein the memory ordering data structure within the executable image references generated first instructions by instruction memory address.

14. A computer system comprising:
one or more processors; and one or more computer-readable media having stored thereon computer-executable instructions that are executable by the one or more processors to cause the computer system to generate binary emulation metadata during source code compilation, including at least:
during compilation of source code into a plurality of first machine code instructions of a first processor Instruction Set Architecture (ISA), encountering a memory ordering constraint specified in the source code;
based on encountering the memory ordering constraint, generating, during the compilation, binary emulation metadata that is configured to be used during emulation of one or more of the plurality of first machine code instructions on a second processor ISA to enforce the memory ordering constraint within one or more corresponding second machine code instructions of the second processor ISA, wherein the generated binary emulation metadata includes a memory ordering data structure that associates a corresponding instruction memory address of each of the one or more of the plurality of first machine code instructions with at least one of a read barrier or a write barrier; and
storing the generated binary emulation metadata in association with the plurality of first machine code instructions, including storing the memory ordering data structure separate from an instruction stream comprising the plurality of first machine code instructions.

15. The computer system as recited in claim 14, wherein the memory ordering constraint comprises at least one of: an annotation keyword affecting at least one of a memory read or a memory write specified in the source code; or an intrinsic affecting at least one statement or at least one code block of the source code.

16. The computer system as recited in claim 14, wherein storing the generated binary emulation metadata in association with the plurality of first machine code instructions comprises storing at least part of the binary emulation metadata within an executable image that includes the plurality of first machine code instructions.

17. The computer system as recited in claim 16, wherein the generated binary emulation metadata also includes at least one of:
a range data structure that identifies one or more ranges of instruction addresses corresponding to the plurality of first machine code instructions; or
at least one no-operation (no-op) instruction that is emitted into the instruction stream comprising the plurality of first machine code instructions, and wherein the memory ordering data structure associates an instruction memory address for the no-op instruction with at least one of the read barrier or the write barrier.

18. The computer system as recited in claim 14, wherein the generated binary emulation metadata is referenced by a header of an executable image.

19. The computer system as recited in claim 14, wherein storing the generated binary emulation metadata in association with the plurality of first machine code instructions comprises at least one of:
storing at least part of the binary emulation metadata as a separate file than an executable image that includes the plurality of first machine code instructions; or
storing at least part of the binary emulation metadata within the instruction stream comprising the plurality of first machine code instructions.

20. A hardware storage device having stored thereon computer-executable instructions that are executable by one or more processors to cause a computer system to generate binary emulation metadata during source code compilation, including at least:
during compilation of source code into a plurality of first machine code instructions of a first processor Instruction Set Architecture (ISA), encountering a memory ordering constraint specified in the source code; based on encountering the memory ordering constraint,
generating, during the compilation, binary emulation metadata that is configured to be used during emulation of one or more of the plurality of first machine code instructions on a second processor ISA to enforce the memory ordering constraint within one or more corresponding second machine code instructions of the second processor ISA, wherein the generated binary emulation metadata includes a memory ordering data structure that associates a corresponding instruction memory address of each of the one or more of the plurality of first machine code instructions with at least one of a read barrier or a write barrier; and storing the generated binary emulation metadata in association with the plurality of first machine code instructions, including storing the memory ordering data structure separate from an instruction stream comprising the plurality of first machine code instructions.

* * * * *